United States Patent [19]
Snider

[11] Patent Number: 5,662,079
[45] Date of Patent: Sep. 2, 1997

[54] MANIFOLD FLOW TURNING VANES IN INTERNAL COMBUSTION ENGINES

[76] Inventor: John Michael Snider, 2116 Hobbs Rd., N-7, Nashville, Tenn. 37215

[21] Appl. No.: 572,967

[22] Filed: Dec. 15, 1995

Related U.S. Application Data

[63] Continuation-in-part of Ser. No. 266,266, Jun. 27, 1994, abandoned.

[51] Int. Cl.$^6$ ............................................. F02M 29/00
[52] U.S. Cl. ............................................. 123/188.14
[58] Field of Search ............................... 123/308, 188.14, 123/590

[56] References Cited

U.S. PATENT DOCUMENTS

| | | |
|---|---|---|
| 3,579,981 | 5/1971 | Gau . |
| 3,757,757 | 9/1973 | Bastenhof . |
| 3,811,416 | 5/1974 | Gospodar et al. . |
| 3,861,376 | 1/1975 | Ashley . |
| 4,320,725 | 3/1982 | Rychlik . |
| 4,428,334 | 1/1984 | Klomp . |
| 4,537,028 | 8/1985 | Humke . |
| 4,911,205 | 3/1990 | Myers . |
| 4,976,231 | 12/1990 | Fueling . |
| 5,109,668 | 5/1992 | Lindstedt . |
| 5,323,661 | 6/1994 | Cheng . |

FOREIGN PATENT DOCUMENTS

| | | | |
|---|---|---|---|
| 2923606 | 3/1980 | Germany . | |
| 52-64512 | 5/1977 | Japan . | |
| 54-22216 | 5/1979 | Japan . | |
| 55-35177 | 3/1980 | Japan . | |
| 2230920 | 9/1990 | Japan | 123/590 |
| 448286 | 6/1936 | United Kingdom | 123/590 |

OTHER PUBLICATIONS

R. A. Wallis, Axial Flow Fans and Ducts, John Wiley & Sons, New York.

*Primary Examiner*—Erick R. Solis
*Attorney, Agent, or Firm*—Luedeka, Neely & Graham, PC

[57] ABSTRACT

Gas flow pressure losses through fuel charge and exhaust gas flow conduits for internal combustion engines are greatly reduced by turning vanes in conduit flow bends of greater than 9° around an inside radius of less than twice the effective diameter of the conduit. Such turning vanes are preferably given leading edge bevels of about 20° to 24° and trailing edge bevels of 13° to 17° which are substantially centered about an arc radius through the angular center of the flow bend.

18 Claims, 9 Drawing Sheets

R = 0.586c Optimized Constant Thickness Turn Vane

Ideal Airfoil Type Turn Vanes

Definition of Corner Variables 5,662,079

MANIFOLD FLOW TURNING VANES IN INTERNAL COMBUSTION ENGINES

CROSS-REFERENCE TO RELATED APPLICATION

This application is a Continuation-in-Part of Ser. No. 08/266,266 filed on Jun. 27, 1994, now abandoned.

BACKGROUND OF THE INVENTION

1. Field of the Invention

The present invention relates to internal combustion engines. More particularly, the invention relates to methods and apparatus for reducing the manifold conduit pressure losses by fuel vapor flows to combustion chamber and exhaust gas flows therefrom.

2. Description of the Prior Art

Motor vehicle designers seek the smallest possible power plant so that more of the vehicle volume can be used for passengers and cargo. Equipping a vehicle with a smaller power plant reduces the weight leading to additional fuel efficiency. Engine designers seek engines that convert the heat energy in fuel to shaft power as efficiently as possible and, simultaneously, to get as much air and fuel into and out of the engine as possible. These two design goals result in high output for a given engine size. Unfortunately, an engine that meets these design goals will not be of the smallest possible volume, because of the fluid mechanics of fluid flow.

When a flow stream moves around a corner, the molecules in the fluid seek the path of least resistance-the molecules go to low pressure. Pressure gradients are caused by variations in the speed of the flow stream and by friction. High speed portions of the flow stream are at low pressures while low speed portions are at high pressure.

In a turn, the highest speeds and lowest pressures are found in the inside radius of the turn at the apex, or midpoint of the turn. The highest pressures (and lowest velocities) are found just before the start of the turn on the inside, on the outside apex of the turn, and on the inside just after the turn. Molecules approaching the turn on the side of the duct near the inside of the turn slow. They are caught up in the space upstream of the high velocity molecules passing near the inside around the apex of the turn. Thus, at the beginning of the turn most of the flow occurs near the wall opposite the inside of the turn or on the outside of the turn. When the flow reaches the apex of the turn, most of the flow is at the inside of the duct going at high speeds. This momentum carries the flow to the outside of the duct at the end of the turn, forming three spaces of stagnant or low flow. These spaces are: upstream of the turn on the inside wall, in the middle of the turn on the outside, and on the inside wall on the downstream side of the turn.

This flow pattern is readily seen in a river. Just before a bend in the river the flow is on the bank opposite the turn. Half way through the bend, the flow is against the bank on the inside of the bend. The main part of the flow then moves back to the outside bank downstream of the bend. This flow pattern is inefficient. It does not use all the area of the duct and requires energy to be used to speed up and slow portions of the total flow. In addition, some slow-moving flow in the three stagnant areas is swept into the main flow stream causing momentum losses. Another way to consider this is that, energy in the flow stream must be used to force the flow around sharp bends. If the river turns less than nine degrees this effect is not seen—the flow stays constant across the area and there is little pressure drop and flow loss.

The problem of flow loss caused by changing the direction of a flow stream has been studied in fluid mechanics for many years. It has been found that the pressure drop caused by a flow direction change is equal to the following:

$$P_d = \frac{K \times V^2}{2} \times D$$

Where $P_d$ is the pressure drop across the turn, K is the loss coefficient, V is the average velocity of the flow stream, and D is the density of the fluid that is flowing.

Finding the loss coefficient is difficult; experimentation is the usual method. However, when the geometry is simple, super computers can model the loss coefficient accurately. Fluid mechanics texts, handbooks, and other references have tables, graphs, and charts that relate the loss coefficient to the various dimensions of turning flow streams. These references offer little on how to reduce the loss coefficient other than by increasing the inside radius of the flow stream. Close inspection of this data does show that flow streams in rectangular ducts have smaller loss coefficients than flow streams in ducts of circular cross-section.

Also, from this data, a bend in the flow stream with the smallest loss coefficient has an inside radius that is twice the diameter of the duct. Ducts with turn radius to diameter ratios larger than two have increasingly larger loss coefficients due to increasing wall friction caused by the longer turn length. The inlet port in current V-8 engines is approximately three inches high and makes nearly a ninety degree turn. A low flow loss port would have a six inch inside radius. Add to that the three inch port and some metal at each end and the cylinder head would be over ten inches tall. Such an engine would also require long stem valves and stronger, mechanisms to operate the longer and heavier valves.

Engines that move large quantities of air and fuel also have efficient valve mechanisms that control the flow into and out of the engine with the least amount of flow resistance. High flow passages also use space that other engine structures such as head bolts, cooling passages, oiling passages, and valve actuation mechanisms must have. Consequently, the engine must be even larger to hold these components. Clearly, such an engine is impractical.

Naturally aspirated engines—engines that are not pressurized by turbochargers or superchargers—fill their cylinders from a constant pressure source. It is the atmosphere. The difference between atmospheric pressure and the pressure in the cylinder during the intake stroke provides the differential to fill the cylinder. This differential must accelerate the incoming flow stream and overcome flow losses.

Ideally, the cylinder attains full atmospheric pressure when it is filled with air and fuel. This gets the maximum mass of air and fuel into the cylinder for maximum output. Flow losses in the air intake system, air cleaner, carburetor, intake manifold, cylinder head, and around the intake valve prevent this. Since air is compressible, the cylinder does not get filled with air and fuel at atmospheric pressure. The density of the charge is lower because the pressure is lower in the cylinder due to flow losses. Less air and fuel are available for combustion, resulting in less than full power from each cylinder and less than full power from the engine.

The flow loss pressure differential is found, using the equation given above. Thus, the flow loss pressure differential of the intake air fuel mixture increases with the square of the velocity of the intake air fuel mixture. At higher engine revolutions the total pressure drop from flow losses increases rapidly; engine power drops dramatically.

Once engine speeds, and inlet flow stream velocities, near the point where the loss coefficient pressure nearly equals the pressure drop created by the engine's moving pistons, engine power decreases by the cube with additional increases in engine speed. This is because the air fuel mixture is compressible; The mass of air getting into the engine is a linear function of cylinder pressure that is decreasing by the square of the velocity. The amount of mass entering the cylinder drops by the cube of engine speed. Small reductions in the loss coefficient result in large improvements in peak power production.

Designers have achieved the required engine power output by operating their engines at lower shaft speeds and increasing engine displacement to overcome the effects of the low flow inlet and outlet passages of current design. This keeps the engine smaller than one with ideal flow passages, however, the engine displacement must be larger to produce the same power. The engine is heavier adding unnecessarily to vehicle weight. Even more fuel is needed to move the heavier vehicle.

One approach designers have used is to provide parallel paths into and out of the engine. The result is designs with four valves per cylinder that have higher turn radius to diameter ratios and better use the space in the combustion chamber for flow. This approach adds complexity and increases the size of the design. Also, the smaller passages result in higher wall friction losses. All the complexity adds to the cost of manufacture, raising the price of the motor vehicle.

This invention will show a way to increase the flow in and out of an engine. The invention may be used in new engine designs or retrofitted to existing designs already in service.

SUMMARY OF THE INVENTION

Some texts on fluid mechanics refer to a practice developed in the Heating Ventilating and Air-Conditioning (HVAC) industry. This industry has developed a method to lower the loss coefficient of ducts that have zero radii or "mitered" ninety degree turns. Mitered turns occur frequently in the ventilation systems of buildings; they occur wherever a duct turns from the ceiling to go down a wall, etc. This method has improved flow around the mitered turn to the point that the loss coefficient approaches that of an ideal turn. It eliminates the need to have an ideal turn with an inside radius that is twice the duct diameter. These mitered ducts use vanes to guide the flow around the turn. "Turning vanes" are centered along a radius line that passes through the center of the turn. (For a ninety degree turn this is at forty-five degrees). A recent patent gives an example of this method. See U.S. Pat. No. 4,911,205 to Meyers et. al.

Turning vanes divide the duct into multiple ducts that have ideal inside radius to diameter ratios, and they provide a surface that forces the molecules in the flow stream around the turn. This external momentum change from the array of vanes eliminates the large pressure and velocity gradients that a turn in a duct without turning vanes develops. Turns equipped with turning vanes almost fully use the duct cross-section and greatly reduce the pressure drop across the turn.

These vanes can be a source of flow loss. The upstream edge of the turning vane will stop flow creating a stagnant area. Downstream edges that end abruptly and do not allow the flow to recover will form a similar stagnant area. These stagnant areas result in momentum changes leading to pressure drop. Fluid mechanics calls this form of pressure drop "bluff body flow loss." Bluff body flow is well studied so it can be minimized.

Inlet air, air fuel mixtures, and combustion products must negotiate many turns and flow around many obstructions while flowing through an engine. Typically, inlet air is ducted from the front of the car, where the air is cool and at high pressure, to an air cleaner. Using turning vanes allows the ducting to be made of smaller diameter components that are more compact. After passing through an air cleaner, the inlet air usually must turn ninety degrees and enter a carburetor or throttle body. Turning vanes will greatly reduce the flow loss from this turn and the entrance losses into the carburetor or throttle body; the air cleaner can be more compact.

Next the flow from the carburetor or throttle body enters the intake manifold. Unless the manifold has individual runners (a carburetor or throttle body for each cylinder) the flow enters a plenum chamber, or in a dual plane manifold two plenum chambers. Plenum chambers receive the flow stream from the carburetor or throttle body and distribute portions of the flow to ducts that carry the flow to each cylinder. These ducts are known as runners. Turning vanes can be used to help turn the flow into each runner and to distribute it equally between the runners. Runners also must turn the flow, sometimes in multiple planes, to get the flow to each cylinder's intake port. Vanes will reduce the loss these turns add to the engine's total loss coefficient.

Flow streams in the intake port of the typical cylinder head are complex. Space considerations result in a rectangular intake port near the manifold. Some engine designs have a protrusion into the intake port to provide room for cylinder head bolts or pushrod that operate the overhead valves. This protrusion adds additional flow loss. Flow must then pass from the rectangular intake port into a cavity of round cross-section just above the poppet valve, while simultaneously making nearly a ninety degree turn. This round cavity just upstream of the intake valve is known as the intake valve bowl or simply bowl.

Lastly, the flow encounters the intake valve on its way into the cylinder. Intake valves create large flow losses; the flow stream runs into the head of the intake valve that is perpendicular to the flow. The flow then passes through a narrow annular passage between the valve head and valve seat. Flow stream energy is used to generate high velocities to compensate for the reduced flow area in the annular passage and to turn the side stream flow caused by the valve head. Combined, these effects cause high flow losses.

The turn into the intake valve bowl causes a flow pattern like the river bend where most of the flow passes near the intake port roof just before the turn. Main flow then nears the inside edge of the port bowl at the apex of the turn. Momentum carries the main portion of the flow across the head and stem of the intake valve and out into the cylinder. Flow losses due to the turn, poor utilization of the available intake valve flow area, bluff body flow loss from the valve stem, and the momentum imported to the flow by the valve head that is perpendicular to the main flow direction all combine to cause large flow losses.

Turning vanes will decrease these flow losses while retaining the current compact design. Suitable turning vanes will assure even flow across the intake port and minimize flow losses as the inlet stream passes around obstructions and any turns encountered in the head before the bowl. "Transition turning vanes" located in the bowl serve two functions. The first function is to turn the flow from a direction parallel to the axis of the intake port to a direction parallel to the axis of the stem of the intake valve. Secondly, transition turning vanes distribute the flow evenly across the circular bowl as it leaves the rectangular intake port with minimal flow loss. Attaching a circular turning vane to the intake valve will reduce the flow loss caused by the valve on its upstream side.

Similarly, turning vanes improve flow on the exhaust side of the engine. On the exhaust stroke, cylinder movement and residual combustion pressure forces the exhaust gases around the exhaust valve. The valve opening makes flow losses known as entrance losses. Entrance losses are caused by fluid that enters the flow space from the side causing momentum that is not in line with the flow. This causes a vena-contracta—a flow area that is smaller than the valve opening area. Downstream of the vena-contracta, the flow must slow and distribute itself across the available flow area. In piping systems, reestablishing even flow takes a straight length of pipe ten diameters long.

Exhaust ports in an engine make a turn immediately after the valve. Flow losses are near the maximum. A turning vane mounted to the stem of the exhaust valve will provide a momentum reaction surface that will spread the flow evenly around the available flow area of the exhaust valve opening. Exhaust valve turning vanes direct the flow stream into the exhaust port transition turning vanes evenly using the entire area of the valve bowl. Also, an exhaust valve with a turning vane would help the flow stream recover pressure or reduce speed after passing by the seats of the exhaust valve. Turning vanes in the exhaust manifold(s) and in other exhaust system bends with low radius to diameter ratios would keep these components small without contributing to total pressure losses. Flow losses would be reduced to a minimum, while volumetric efficiency and specific output of the engine would be maximized.

Other engine types would have performance improvements using turning vanes. Two-cycle engines, which use crankcase induction, have a large flow restriction in the inlet port area. Air-fuel mixture traveling from the crankcase up into the inlet ports must make a mitered ninety degree turn. Turning vanes would be very beneficial in these two-cycle engines.

Diesel engines use the heat of compression to ignite the air fuel mixture. Incompletely filled cylinders will not reach optimum compression temperatures and pressures. Efficiency and power output drop simultaneously. Turning vanes would help diesel engine designs fill their cylinders with air and get the combustion products out. Both two and four cycle diesel engines would benefit.

Turbine engines move large volumes of air and fuel. Machines powered by turbine engines must have large inlet and exhaust ducts to move these volumes. It is desirable to keep these ducts as compact as possible. Turning vanes attain these two design goals.

Another popular engine design is known as the Wankle. Wankles have a three-lobe rotor that moves in a combined linear and rotary motion. This engine type has no valves; The lobes of the rotor provide the valving function like the piston in a two-cycle engine. Wankles may be operated at very high output shaft speeds. Flow streams in a Wankle must turn and be distributed as in any other engine type. Turning vanes would minimize these flow losses in the Wankle.

These and other objects, features, and advantages will be further refined, highlighted, and made apparent in the following detailed description of the disclosed embodiment, the appended drawings, and claims.

BRIEF DESCRIPTION OF THE DRAWING

With reference to the several figures of the drawings.

DESCRIPTION OF THE PREFERRED EMBODIMENT(S)

Figure 1:
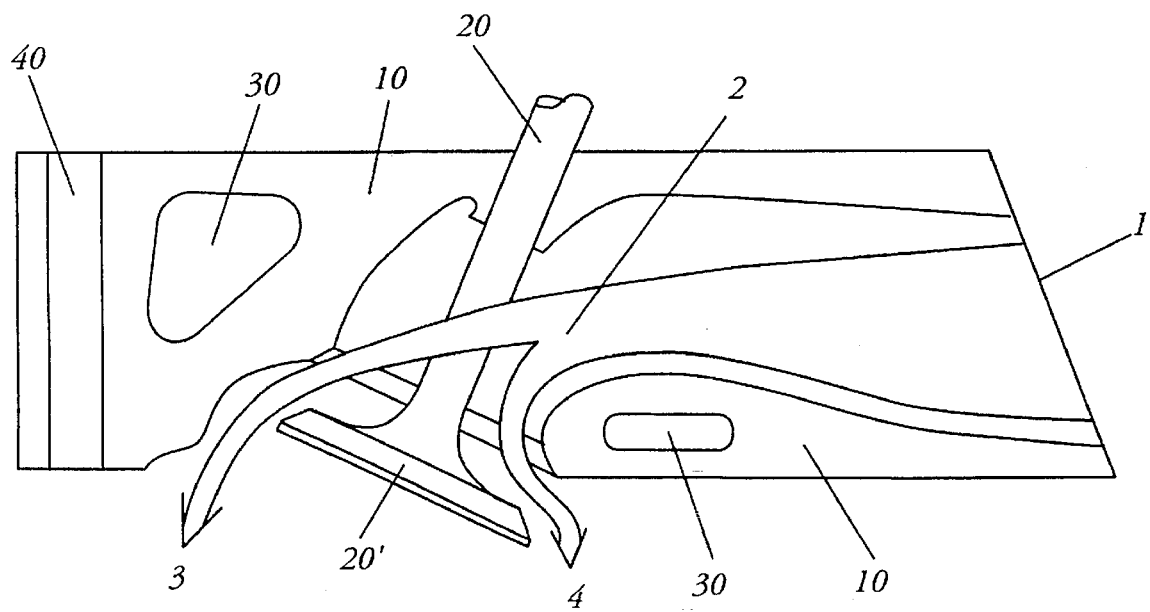
FIG. 1 is a cross-sectional view at the intake valve port of a typical reciprocating engine.

Turning now to the drawings—in which like numbers show like elements throughout the different figures—FIG. 1 is a cross-sectional view at the intake passage of a typical cylinder head 10. A valve 20, cooling passages 30, and a cylinder head bolt hole 40 are also depicted. On the right side of FIG. 1 is a flow stream that enters the intake passage at a point identified as 1. At 1, the flow stream in an engine should be fully developed—flow that uses almost all of the flow area and the velocity across the area is of the same speed. Manifold design influences how closely the actual flow stream is to fully developed. Point 2 is where the flow stream splits, and the smaller portion is forced to turn to point 4. The tight turn causes high velocity/low pressure flow at point 2. Low pressure pulls the flow stream to the bottom or floor of the intake passage. The space below where the valve stem passes out of the top of the cylinder head 10, is not used. Instead, stagnant flow is occasionally swept into the high velocity stream causing momentum loss. The high velocities cause unrecoverable pressure losses due to this momentum exchange.

The larger portion of the flow stream moves across the valve bowl passing around the valve stem at high velocity, reaching point 4. The valve stem causes bluff body flow losses. Additionally, the flow stream is not distributed evenly around the circumference of the valve, limiting flow potential. Large pressure drops generated by the above flow losses cause incomplete cylinder filling. Maximum flow of air and fuel is not achieved.

Besides poor cylinder filling, changing the velocity and pressure of the intake charge will cause the atomized fuel (a gasoline mist) to coalesce forming droplets. These droplets are too large to stay in the flow stream and fall out resulting in poor combustion and reduced engine performance.

Figure 2:
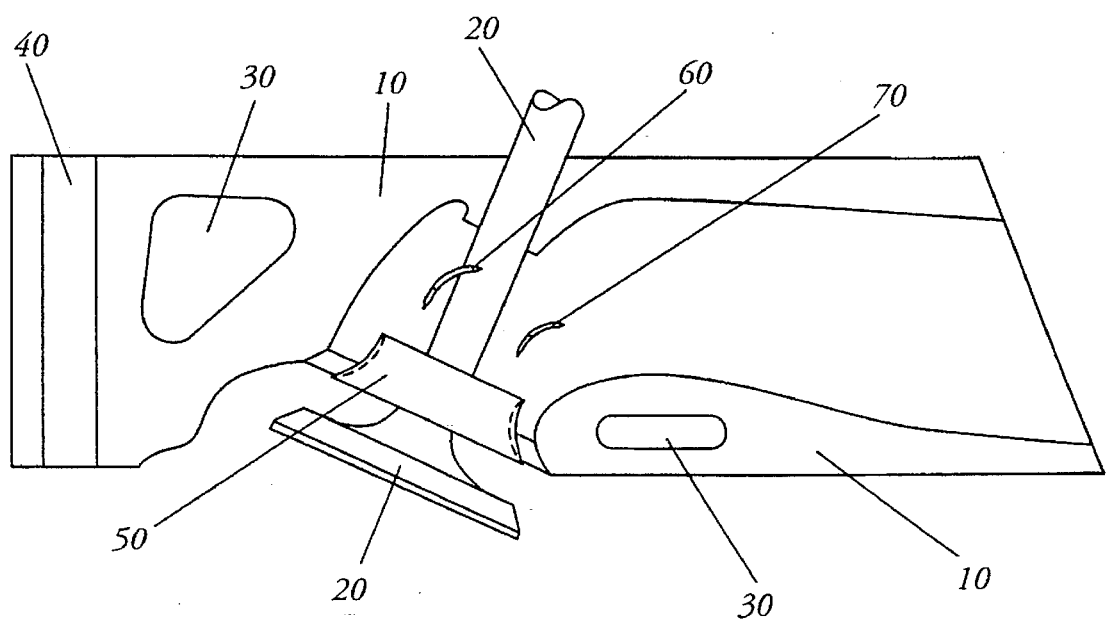
FIG. 2 is a cross-sectional view of an intake valve port similar to that of FIG. 1 but equipped with the turning vanes of the present invention.

FIG. 2 is the same cylinder head cross-sectional view that includes three turning vanes, where the two upstream turning vanes 60 and 70 turn the flow into the third vane 50. Vane 50 is attached to valve 20 moving with it. Attaching this turn vane to the valve can be done as follows. Use several struts that run radially inward from vane 50 and attach the central ends of these struts directly to the valve 20 by welding or to a bushing that is pressed onto the valve's stem. Alternatively, turn vane 50 can be welded to the head of the valve using suitable aerodynamic support legs.

The upstream ends of turning vanes 60 and 70 divide the flow area of the intake passage into thirds. The radius of these vanes and the positioning of the down stream ends forces the flow stream to distribute evenly over the flow area in the valve bowl and into turning vane 50. Vanes 60 and 70 not only reduce the flow losses to near ideal, and they also guide the flow stream from a rectangular duct to a circular duct. The force that these vanes apply to the flow stream changes the direction of the flow stream without large velocity gradients, pressure gradients and unnecessary momentum changes. In practice, the number and placement of these valve and cylinder head turning vane(s) may be found by experimentation or analysis to be different from what is depicted in FIG. 2 to achieve minimum flow loss.

FIG. 2a shows vane 70 in greater detail. Leading edge 72 has been angled 22 degrees relative to the direction of the flow stream. Flow occurs in the direction of the arrow in the upper right corner of FIG. 2a. Trailing edge flow losses have been minimized by angling the trailing edge to 15 degrees relative to the flow direction. This direction is shown by the lower left arrow in FIG. 2a. These angles of 22 and 15 degrees, are approximate, slight variations plus or minus two degrees will not increase flow loss appreciably. Fluid dynamic experiments conducted by the inventor and others have shown that drag, or pressure drop, is minimized when leading and trailing edges are so angled. If the leading edge or the trailing edge angle is less, friction losses are larger. When leading edge or trailing edge angles become larger, pressure losses from stagnation occur and drag (or pressure drop) goes up dramatically.

Turn vane 50 (in FIG. 2) divides into two parts the flow area in the annulus between the valve stem and valve seat of the cylinder head. Vane 50 also forces the flow to turn from a path parallel to the valve stem to one that parallels the valve seats, avoiding unrecoverable pressure losses. Poppet valve pressure loss is similar to orifice plate pressure loss in a piping system. Vena-contracta form downstream of the orifice or valve seats causing reduced effective flow area and higher velocity gradients. Side flow into the stream provides the momentum to form the vena-contracta. Vane 50 will reduce this effect and assure even distribution of flow around the valve.

Figure 3:
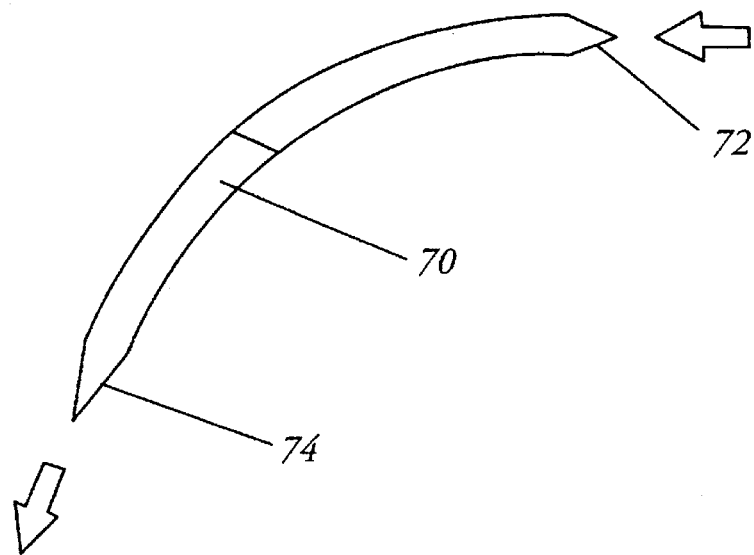
FIG. 3 is an enlarged, cross-sectional detail of a turning vane corresponding to the present invention.
Figure 4:
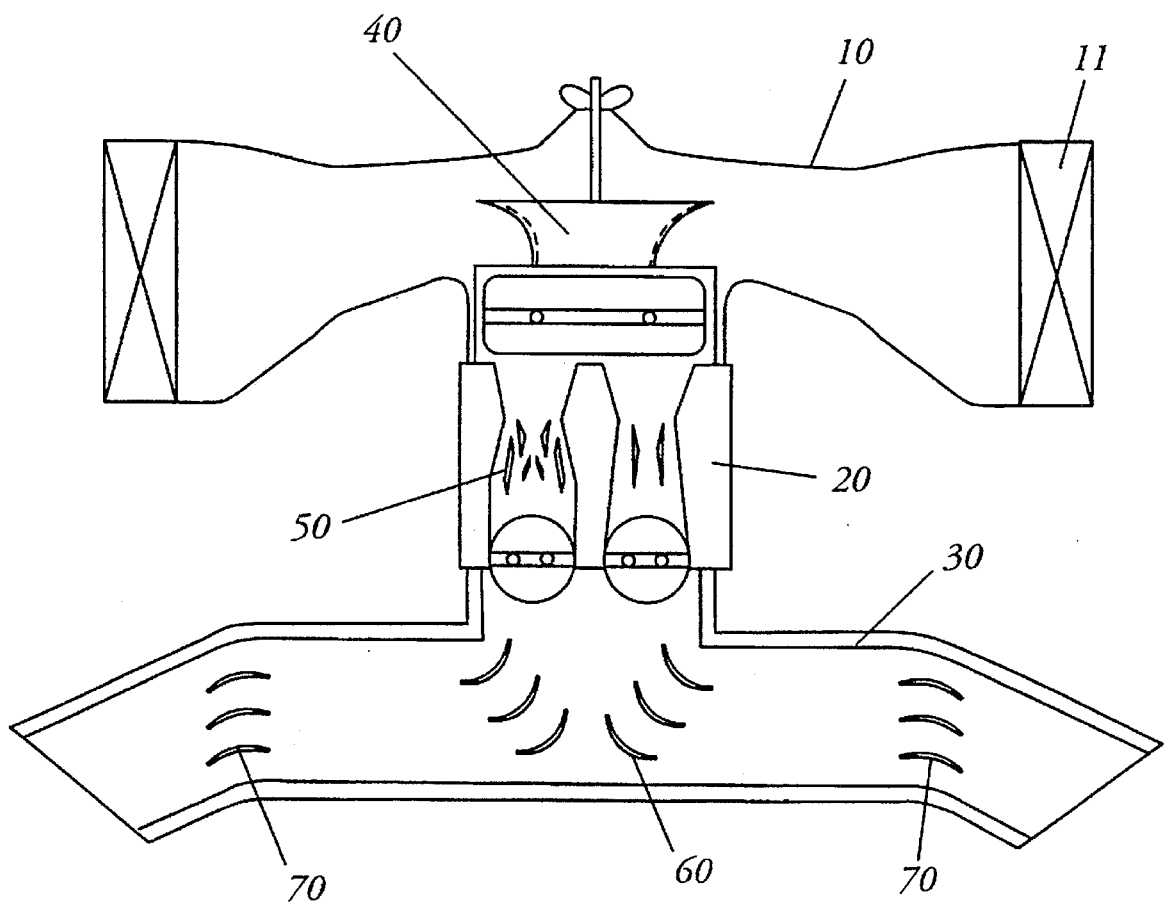
FIG. 4 is a cross-sectional view of an engine carburetor and manifold plenum equipped with the turning vanes of the present invention.

Cylinder head inlet passage losses are the highest losses on the intake side of the engine due to the combination of the intake valve and eighty degree (approximately) short inside radius turn. Other losses on the intake side of engines are caused by flow stream turns in the intake manifold, carburetor, and air cleaner. Turning vanes can almost reduce these losses to those that occur in a turn of ideal radius. FIG. 3 depicts these flow stream bends and turning vanes that recover much of the flow. An air cleaner 10 with its air filter 11 are shown on top of a carburetor 15 with its choke and throttle plates. The carburetor is on an intake manifold 30 that distributes air and fuel from the carburetor to the multiple cylinders in a "V" engine.

Turning flow losses occur inside the air cleaner where the flow must turn ninety degrees into the air horn of the carburetor; in the plenum where the flow stream to each cylinder must turn ninety degrees into manifold runners; and, at bends in each runner. Turning vane 40 provides a surface that forces the air around the turn into the carburetor with minimal pressure and flow loss. A secondary benefit derived from vane 40 is that the flow will be approaching the venturi of the carburetor straight on, eliminating any turning losses that were occurring inside the carburetor. One vane is depicted, it may be found by experiment or calculation that more vanes placed differently will further improve the flow.

Once in the carburetor, air passing through the venturi is forced to flow in a smaller diameter where it gains velocity causing the pressure to drop. This low pressure zone is used to pull in fuel. As the air and fuel leave the vena-contracta, the flow must slow and distribute across the increasing area of the lower part of the venturi. The angle of the recovery portion of the venturi cannot exceed nine degrees or separation, eddying, and flow losses will occur. Conical turning vanes 50 (they are shown in cross-section) may be used to increase this angle and make carburetors more compact. As shown in the figure, the lower portion of the venturi is approximately half as long as the conventional venturi shown on the right in FIG. 3.

Air and fuel from the carburetor enter the manifold where the flow must make a mitered ninety degree turn in many engine designs. Tuning vane 60 is one of the six vanes shown in FIG. 3 which turn the flow leaving the plenum into two intake manifold runners leading to two cylinders in a multicylinder engine. The manifold in FIG. 3 is known as a single plane manifold. Other manifold types will flow more fuel and air at comparable pressures if they too have similar turning vanes. Particularly "H" pattern dual plane manifolds, which are found on most production engines.

In the intake runner, the flow stream must pass several bends in different planes on the way to the cylinder head. Turning vanes 70 guide the intake runner flow around such a bend. Some intake manifolds have bends that turn the flow in two planes simultaneously. Turning vanes for each plane of such a turn are needed to achieve near ideal flow. Again, it is emphasized that FIG. 3 may not be the arrangement that results in the lowest pressure losses. Different numbers and arrangement of the turning vanes may yield lower pressure losses.

Gross Corner Losses

Flow in a curved duct is subjected to centrifugal force. Centrifugal force is equal to:

$$Fc = Gc * m * \frac{V^2}{R}$$

Where: Fc is the force that acts parallel to the radius of the turn; Gc is a gravitational constant dependent on the units in use; m is the mass of the object; V is the velocity of the object perpendicular to the radius of the curve; and R is the radius of curvature.

For a given velocity, the fluid molecule is subjected to the least force by staying to the outside of the duct. However, this does not what occur. A second force is also at work. The curvilinear velocity component that develops while the flow is turning, causes a second force. A pressure drop, due to this turn induced velocity, is the source of this second force. Bernoulli's equation (a special form of the energy equation) relates kinetic energy to potential energy. In a fluid system this potential energy is pressure and kinetic energy depends on the square of the velocity. Therefore, the local pressure drops with the square of the velocity increase. Low pressure, from the turning velocity component, pulls the flow to the inside wall of the duct. Turning accelerations are highest at the beginning and end of the turn. While turning velocity peaks at the middle of the turn. When conditions are right, a balance occurs between these two forces.

Usually, centripetal and hydrodynamic forces combine to cause a flow regime described as follows. At the beginning of the curve there is a pressure increase that accelerates the flow to the outside of the turn. Reduction in flow area occurs and creates a high speed jet. Particles on the outside of the turn must go further because the radius is larger and the path they cover on the outside is longer. Together, this means the outer flow must go faster, but with this speed, comes a pressure drop that pulls the flow to the inside of the turn. Flow winds up on the inside of the duct at mid-turn, as a result. The high velocity flow then rushes across the duct to the outside wall where the flow slows recovering pressure and redistributing across the duct area. Three volumes of stagnant flow develop. First, is the upstream stagnant zone one on the inside of the turn. Second, is the mid-turn one on the outside of the duct. And, the last one develops on the inside of the exit of the turn.

This flow pattern is readily seen in a river. Just before a bend in the river the flow is on the bank opposite the turn. Half way through the bend, the flow is against the bank on the inside of the bend. The main part of the flow then moves back to the outside bank downstream of the bend.

This description of a flow regime is one that is not ideal. Curvature of the duct is too tight and centripetal accelerations and velocity accelerations are out of balance. High flow losses occur due to energy used to speed up and slow portions of the total flow. In addition, some slow-moving flow in the three stagnant areas is continually swept into the main flow stream causing momentum losses.

Further complicating any analysis of corner losses is friction. Flow near the walls of the duct is stopped due to surface roughness and molecule interaction. A boundary layer develops as molecules rub past the stopped ones on the wall and continue. The boundary layer stops at the point away from the wall that the velocity is the same as the flow in the center of the duct. Velocity, fluid viscosity, duct roughness, and duct shape effect this boundary layer thickness and determine its impedance to flow.

A round duct will develop secondary flow circulations. These flows result from the differences in the radius of curvature around the circular cross-section of the duct. Similar secondary flows also may develop in rectangular and other none circular duct cross-section shapes due to corner interaction. Secondary flows are yet another source of flow impedance.

When the curvature of the duct is ideal-the curvature with the least resistance to flow—the centrifugal forces balance the pressure gradient developed in the flow and flow separation from the walls of the duct does not occur.

Computers can now be used to model these flow regimes accurately. However, the FIG. 5 graph of Gross Corner Loss Coefficient is based on test data.

This data applies to both circular and noncircular ducts and is presented for 30, 45, 60, 75, and 90 degree duct turns. To use the data on noncircular ducts the diameter of a round duct that flows the same volume as the noncircular duct under identical conditions must be found. The diameter of this equivalent round duct is known as the hydraulic diameter of the duct. Calculation of the hydraulic diameter is done, using the following definition:

$$\text{Hydraulic Diameter} = Hd = \frac{4 \times A}{P}$$

Where A is the Cross sectional Area of the duct and P is the Perimeter of surfaces in shear with flow.

Applying this definition to a circular duct yields the expected answer—for circular ducts the area is pie times the diameter of the duct squared all of this divided by four. The perimeter length in shear contact with the flow is pie times the diameter. The hydraulic diameter of a circular conduit is simply the diameter of this conduit. Again, hydraulic diameter is the diameter of a round conduit that flows the same amount as the nonround conduit.

Figure 5:
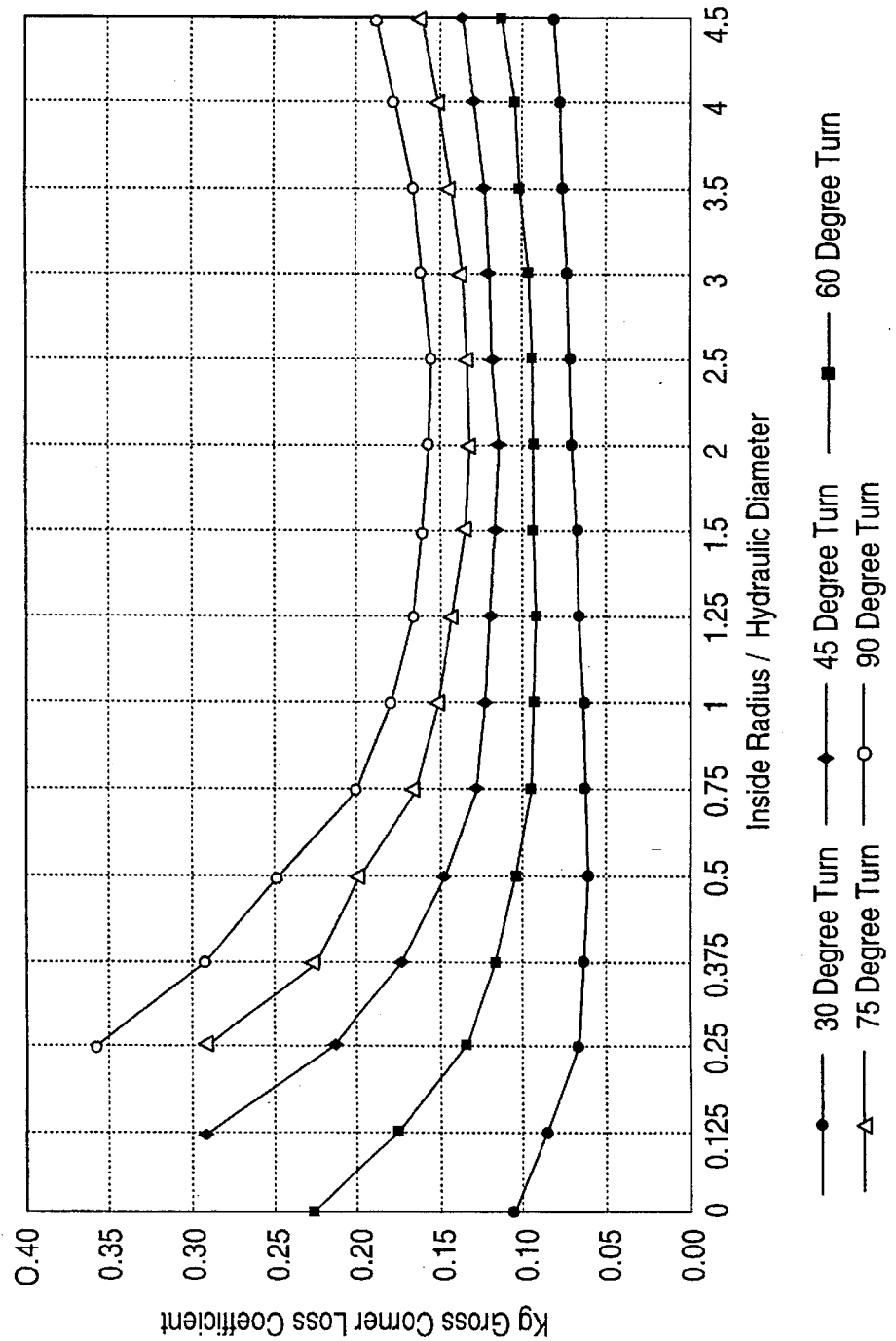
FIG. 5 is a graph of Gross Corner Losses respective to 30°, 45°, 60°, 75° and 90° turns.

Picking the gross loss coefficient off the FIG. 5 chart becomes a simple matter of dividing the inside radius of the turn by the hydraulic diameter. Then use the curve that matches the angle of the turn to find the value.

Calculation of the change in mass flow for a given reduction in the loss coefficient will be developed in the following: Conservation of mass dictates the following equation:

$$M = D \times V \times A$$

Where: M is the mass flow through a duct; D is the Density of the flow; V is the velocity of the flow; and A is the Cross sectional Area of the duct.

The Velocity may be found using Bernoulli's equation:

$$Pd = \frac{V^2}{2 \times Gc} \times (1 + Kg)$$

Where: Pd is the pressure differential across the duct; V is the velocity of the flow; Gc is a gravitational constant dependent on the units in use; and Kg is the gross corner loss coefficient.

Solving for V yields:

$$V = \left( \frac{2 \times Pd \times Gc}{(1 + Kg)} \right)^{1/2}$$

Substituting this expression of velocity into the mass flow rate equation yields:

$$M = D \times \left( \frac{2 \times Pd \times Gc}{(1 + Kg)} \right)^{1/2} \times A$$

In summary, the mass flow rate into an engine varies with the square root of the change in loss coefficient. Air is compressible; the density will vary with pressure and temperature. This relationship may only be used when comparing data taken at one pressure differential, and temperature or the density change will be a factor. Nevertheless, it is illustrative of how much mass of air will move through an engine and how much more torque and power it will produce due to a given reduction in flow loss.

Turn Vane Design

Three general methods of designing turn vanes exist. The first method divides a duct into smaller flow passages that have identical inside radius to hydraulic diameter ratios. It important that these passages have the same R/Hd. For flow distribution between the passages will not be equal and losses will be created. The design should strive to make R/Hd equal to ideal ratio for the angle of the turn. These smaller passages start at the beginning of the turn and go to the exit. Spacings between the passages increase geometrically as they are farther from the inside of the turn. Hence forth, this design is called the partition design.

A second design method also uses curved plates of constant thickness or varying thickness. These plates are spaced along a line in the center of the turn in the duct. Curvature of the vanes is usually identical; however, the spacing between them can remain constant or may vary as each vane gets farther from the inside of the turn. Since the inner and outer radius is the same, a stagnation volume will form in the top of each flow space between the vanes. This stagnant volume causes losses.

Foil designs enjoy an advantage over partition designs. The gross corner loss coefficient of a foil design can be half a partition design. Pressure drops induced in the flow stream by the foil below interact with flow moving in the passage above, helping to turn the flow in the passage above. For this reason foil designs do not start at the beginning of the turn and end at the end as partition designs do. Foil designs cover a much shorter portion of the arc length of the turn than partition designs do allowing passage pressure inter action. Approximately, 25 percent of the centerline arc length of the turn is used. Consequently, it is also important to make the foils c/d ratio the proper value (0.33) to allow maximum pressure interaction.

At first this may seem unimportant. However, the value of Kg is small. Halving this small value and dividing this result produces a large ratio. Even when the square root is taken, the mass ratio can be thirty to 40 percent more than a partition design.

Figure 6:
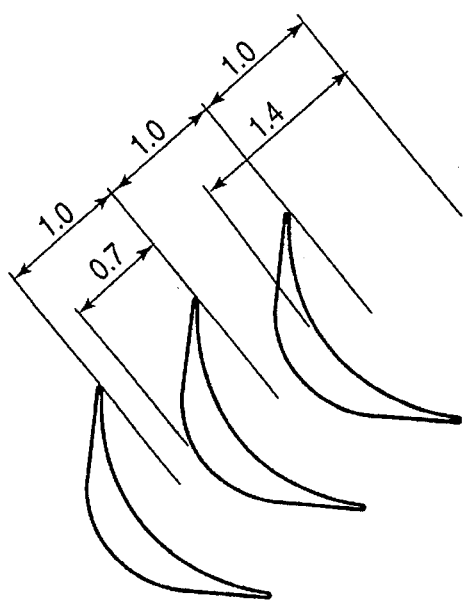
FIG. 6 is an optimized constant thickness turning vane.

Testing has shown that constant thickness turn vanes do not turn the flow ninety degrees if they are ninety degree vanes in a ninety degree turn. They turn the flow eighty five degrees. To get the full ninety degree turn completed an over turn of five degrees is required. Also, it has been found that a short straight section on the head and tail of the turn vane improves performance. This optimized constant thickness vane is shown by FIG. 6.

Foil design is the name of either the ideal airfoil or curved constant thickness plates in the rest of the discussion. The design parameter critical to foil design is the gap to cord ratio. The cord is the length of the line drawn from the most upstream point to the most down stream point of the turn vane. Gap is the spacing between turn vanes. Cord to d ratio is also important.

In a foil design the spacing between turn vanes is critical. Discussion of this important parameter is found in R. Allan Wallis's, "Axial Flow Fans and Ducts," John Wiley & Sons, follows:

The first studies of vanned corners tended to concentrate on a uniform gap/cord spacing and hence the results have a bias toward the inner passage solution. However, it has been demonstrated that an arithmetical progression in gap/cord ratio results in a lower corner loss, particularly for round ducts.

The use of an arithmetical progression involves the choice of an initial gap and the passage number. A successful combination for a rectilinear duct is the initial and final passage gap/cord ratios of 0.33 and 0.65 with a mean value of 0.49. Circular ducts should have an initial and final passage gap/cord ratios of 0.31, 0.75 and an average value of 0.53.

This reference also gives a formula for calculating the arithmetic progression. It follows:

$$\frac{J}{d} = \frac{2\left(\frac{\sqrt{2}}{N} - \frac{s_1}{d}\right)}{N-1}$$

Where: j is the constant distance component of the progression; d is the distance between inner and outer walls of the inlet duct; $s_1$ is the initial spacing; and N is the number of flow passages.

The individual vane spacings are given by:

$$\frac{s_n}{d} = \frac{s_1}{d} + (n-1)\frac{J}{d}$$

Where: N is the first, second, and nth vane passage counting from the inner wall.

Wallis reports on the investigation of others as follows:

These indicate an optimum s/c range, 0.35 to 0.40. The $s_1/c$ values for both the preceding arithmetical progression arrangements lie in the low-loss regimes when an identical value of 0.33 is substituted for c/d.

The best results in each case are obtained with similar vane geometries . . .

Figure 7:
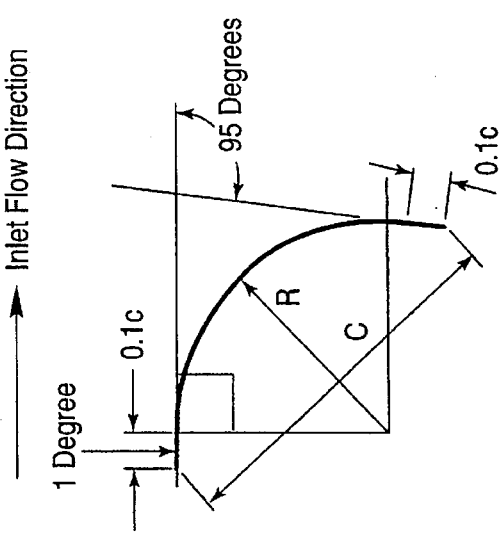
FIG. 7 is an airfoil type turning vane.
Figure 8:
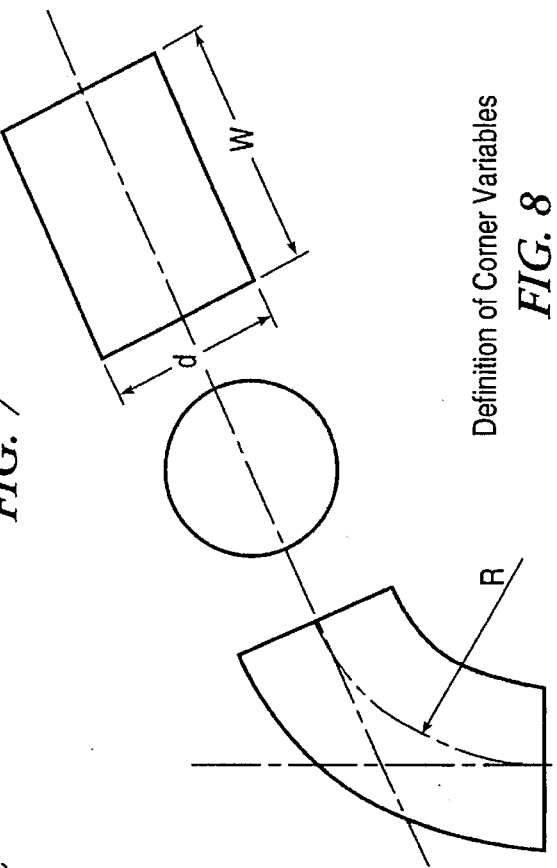
FIG. 8 graphically defines the manifold corner variables.

Using a wing shaped vane that has a larger radius inside curve and a smaller radius outside curve will eliminate this stagnation point and resulting flow loss. FIG. 7, titled "Ideal Airfoil Type Turn Vanes" depicts a design of wing shaped vanes. The vanes are one spacing apart, with an inside radius of 1.4 spacings and an outside radius of 0.7 spacings. Turns fitted with wing shaped turning vanes, a constant area passage geometry, have a corner loss coefficient of 0.05 to 0.0775. s/c for this arrangement is 0.58, s is 0.083 d, c is 0.143 d and d is the distance between inner and outer walls. See FIG. 8 titled "Definition of Corner Variables."

Figure 9:
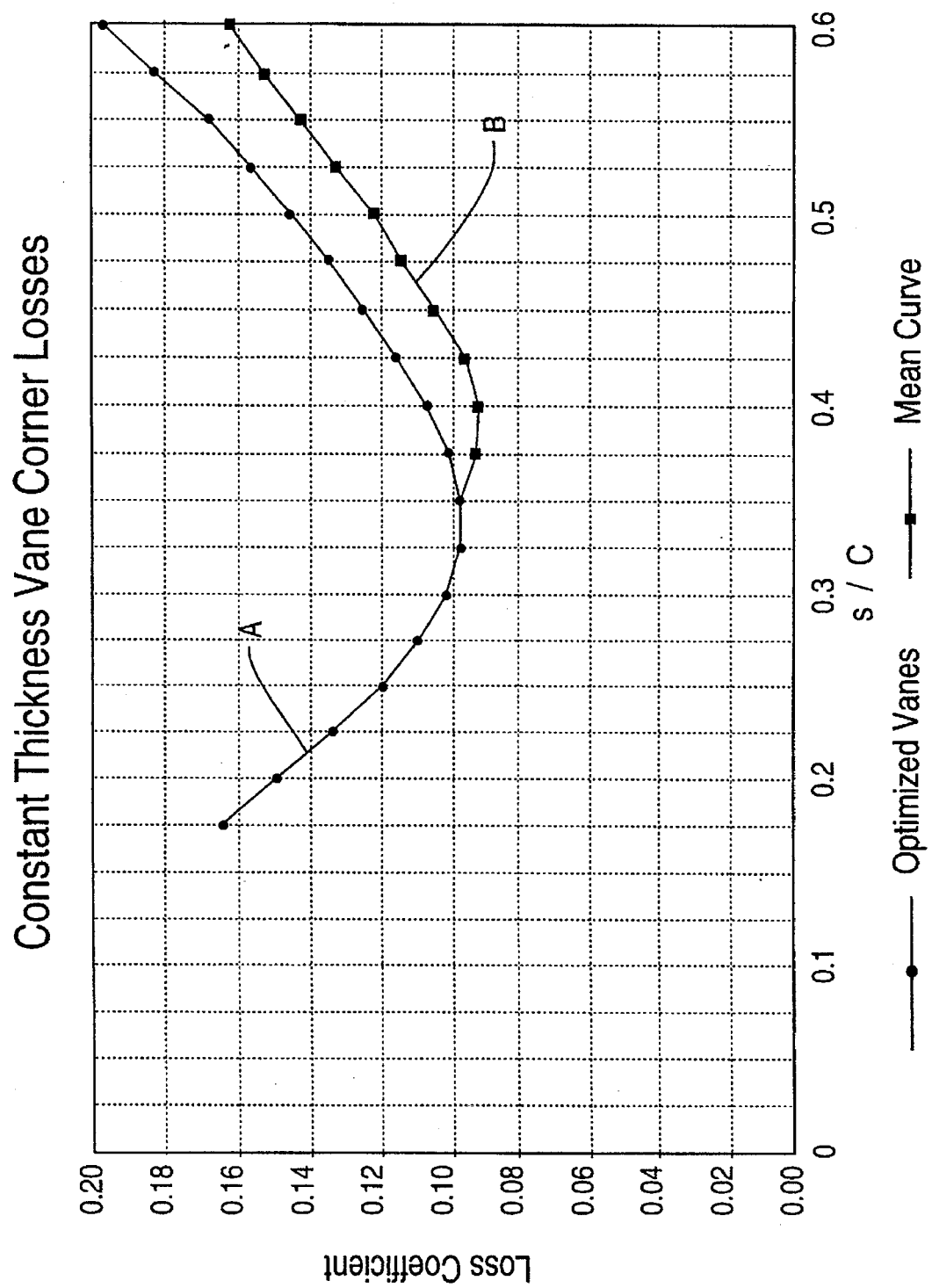
FIG. 9 is a graph of constant thickness vane corner losses.

FIG. 9 is a chart that depicts the loss coefficient of two different constant thickness turn vanes in a ninety degree turn. The first curve A is called a mean vane in the figure and it turns 90 degrees. The second, B, is an optimized vane that turns 95 degrees. Both types have the extensions depicted by FIG. 6. Vane spacing is constant across the duct for both curves.

Again, the loss coefficient for foil vanes is not proportionally much smaller than a partition design's. Or, for that matter, the loss coefficient is not proportionally smaller than that of a typical turn. However, division by such a small number yields a large mass increase.

The third turn vane design differs significantly from the first two. Helically shaped turn vanes are placed up stream of the corner in the duct and are positioned coaxially with the flow. A rotation of the flow is induced by these vanes. The circular momentum imparted into the flow balances the momentum required to force the flow around the turn. The design and performance of this "rotor design" are shown in U.S. Pat. No. 5,323,661 granted Jun. 28, 1994. Rotor designs in this patent have achieved loss coefficients equal to that of a straight run of duct.

Below are examples of how to use turn vanes in engines and what test results have revealed.

Turn Vanes in a V Twin Intake Manifold

Figure 10:
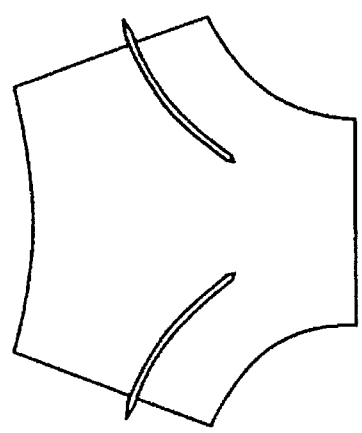
FIG. 10 is a sectioned elevation of a V-twin intake manifold.
Figure 11:
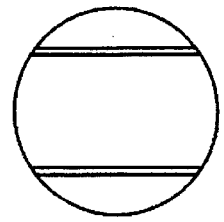
FIG. 11 is a sectioned plan of a V-twin intake manifold.

FIGS. 10 and 11 relate to an intake manifold for an air-cooled V twin four cycle engine. Portrayed in this figure are the "wetted surfaces" of the manifold in a plan view and carburetor end view. Duct diameter and inside turn radius is 1.625 and 1.22 inches respectively for this manifold. The R/Hd ratio is 0.75; and from, the graph of gross corner loss, the loss coefficient is approximately 0.152. A manifold with the minimum loss coefficient of 0.124 would flow; the square root of 0.152 divided by 0.124 or 1.1 times an unvanned manifold under the same conditions.

Designing a partition type turn vanned manifold proceeds as follows. Guess the number of vanes that will divide the duct into passages that have the ideal R/Hd ratio. The first guess was two. Use the ideal R/Hd ratio for the turn angle to calculate hydraulic diameters of the three passages. If the correct R/Hd ratio was used to calculate the passage hydraulic diameters the final passage will fit with in the remaining portion of the duct. Continue iterating until a R/Hd ratio has been found that will place the three passages with in the duct. For this manifold a R/Hd ratio of 2.54 was found to create three passages that fit in this duct.

The next attempt was done with one vane or two flow passages. R/Hd=1.57 put two passages in the duct. A one vane design is closer to the ideal R/Hd ratio of two; so the one vane design was chosen. A new manifold could easily be designed that has R/Hd=2.

This engine has a 720 degree firing order. As a result, both intake valves are not fully open simultaneously. The space between the turn vanes at the carburetor end must therefore have a hydraulic diameter equal to the hydraulic diameter of the outer passage. Shortening the turn vanes to provide a space of the proper dimensions means that the flow must turn approximately thirty-three degrees before it encounters a turn vane. From the gross corner loss graph, a thirty-three degree turn with a R/Hd ratio of 0.75 will have the minimum loss. Since the manifold R/Hd is 0.75, this unvanned part of the turn will have the minimum loss.

A production cast aluminum manifold was cut along the arc lines for the turn vanes on both the top and bottom. Sheet aluminum was cut to the proper dimensions and slid into the kurf. Heli-arc was used to seal weld the kurf and to fuse the vanes to the manifold. Changing the manifold on this engine is a simple matter. This facilitated back to back comparison runs on an engine dynamometer.

During part of this engine's operating cycle three valves are open, two intakes and one exhaust valve. Exhaust flows from one cylinder to the other. Also, this engine has a long stroke and a relative small bore resulting in a large combustion chamber for the engine's displacement. As engine speed reaches a critical value, large reversions of unexpelled exhaust gases go into the manifold and out the carburetor. For these reasons it is not possible to measure the intake air flow. However, test data suggests a six to 7 percent increase in air flow through the engine.

In the final design, the air turned thirty-three degrees without turn vanes. A loss coefficient of 0.061 occurs when R/Hd is 0.75. Remaining are thirty-seven degrees of turn in passages with a R/Hd of 1.57—the loss coefficient is 0.071 approximately. The sum of these two is 0.131. Using the previously defined formula for finding the mass ratio—the square root of 0.152 divided by 0.131 yields 1.07. This matches the above test results.

Foil designs could achieve a loss coefficient of half the partition design, or 0.71 divided by two equals 0.0355. The mass increase would be the square root of 0.152 divided by 0.0355 plus 0.061 or 1.26 times the unvanned turn. Engine torque and power would be increased accordingly.

Turn Vanes in the Inlet Port of a V Eight Engine

Figure 14:
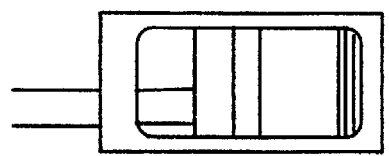
FIG. 14 is a longitudinal port view of a V-8 intake port.
Figure 13:
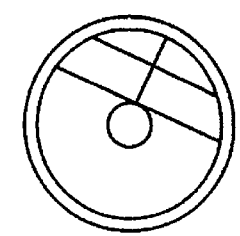
FIG. 13 is a sectioned plan of a V-8 intake port.
Figure 12:
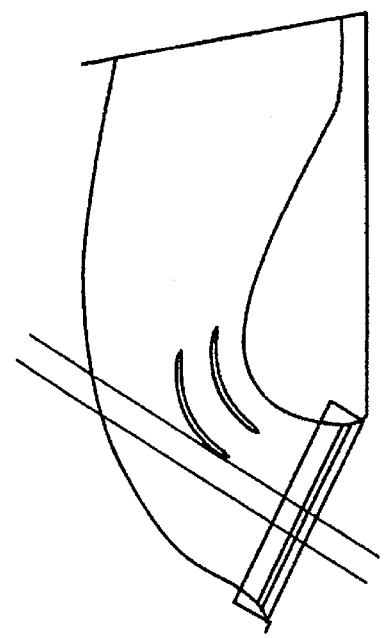
FIG. 12 is a sectioned elevation of a V-8 intake port.

FIG. 12 is of a V-8 intake port and shows the cross section of the "wetted surfaces" of an inlet port found on a common V-8 engine. FIG. 13 views straight into the valve bowl and FIG. 14 views along the inlet into the port. The intake valve on this engine is twenty-three degrees from vertical. (Only the stem of the valve is portrayed.) Incoming air-fuel mixture must turn sixty-seven degrees, flow around the valve, and turn another twenty-three degrees in the cylinder.

The hydraulic diameter of this inlet port is approximately 1.5 inches along the entire length of the port. Three quarters of an inch is the radius of the inside of the turn; Thus, the R/Hd is 0.5. From the gross corner loss coefficient graph, K is 0.171. An ideal K of 0.120 is possible using partition turn vanes. A flow increase of the square root of (0.171 divided by 0.12) or 1.19 times the unvanned flow is possible.

Two partition turn vanes were designed and installed in the cylinder heads. These vanes started at the top of the turn and continued sixty-seven degrees around the turn. Vane spacings inside the round duct at the exit of the turn were found in the same manner as the manifold example above. The R/Hd that fit the port was 1.73.

At the beginning of the turn, the cross-section of the port is rectangular. A rectangular passage height was found for each of the three passages that resulted in a hydraulic diameter equal to each of the circular passage's hydraulic diameters. These rectangular heights were smaller than the circular section spacings, because the hydraulic diameter of the entrance of the turn is larger than 1.5. Moving the vanes down and toward the left on the figure kept the hydraulic diameter constant at the beginning and exit of the turn. The ideal outer vane ended below the top of the valve seat insert. Decreasing the radius of the outer vane brought the end of the vane up above the seat insert.

Stainless steel type 304 was used to make the test vanes. Thermal expansion of the aluminum test head and this stainless are nearly identical. The major benefit is that stainless steel has a heat transfer coefficient that is one tenth that of aluminum. Using stainless steel minimizes heat transfer from the vanes to the inlet air. A small increase in inlet air temperature will reduce the density of the air and lower power from the engine. An epoxy adhesive was used to bond the vanes to the cylinder head.

Before running the turn vane equipped heads, the bare heads were flow bench tested and installed on an engine that was run on an engine dynamometer. Flow bench testing is a static pressure test usually conducted at 28 inches of water column. This engine dynamometer uses a water brake that loads the engine and has provisions for measuring torque, horsepower, and gathers other engine data . . . fuel consumption, temperature, etc. Flow bench test data and highlights of the dynamometer runs follow in Table I:

TABLE I

| Lift | Baseline Flow (CFM) |
| --- | --- |
| 0.1 | 72 |
| 0.2 | 123 |
| 0.3 | 193.5 |
| 0.4 | 234 |
| 0.5 | 264 |
| 0.6 | 261 |
| 0.7 | 262.5 |
| 0.8 | 262.5 |
| No Valve | 265.5 |

The peak torque of 446.3 foot pounds (ft-lbf) and 424.9 horsepower both occurred at 5,000 revolutions per minute (rpm).

After the turn vanes were installed, the following flow bench and dynamometer data were taken:

TABLE II

| Lift | Turn Vanes Flow (CFM) | Percent Change In Flow |
|---|---|---|
| 0.1 | 72 | 0.00% |
| 0.2 | 141 | 14.63% |
| 0.3 | 196.5 | 1.55% |
| 0.4 | 234 | 0.00% |
| 0.5 | 264 | 0.00% |
| 0.6 | 279 | 6.90% |
| 0.7 | 285 | 8.57% |
| 0.8 | 292.5 | 11.43% |
| No Valve | 320 | 20.53% |

The peak torque of 470.1 ft-lbf occurred at 5,000 rpm and peak horsepower of 455.6 horsepower occurred at 6,000 rpm.

This is a 5.33 percent increase in peak torque and a 24.98 percent increase in horsepower.

Additional tests were conducted using different camshafts and well over 500 horsepower was developed by the test engine.

A second engine block was obtained and the test heads, without the turn vanes, were installed. The engine was run on the dynamometer and produced nearly identical power without the turn vanes. Flow bench testing of the now bare ports yielded the following Table III data:

TABLE III

| Lift | Baseline Flow (CFM) | Post Test Flow (CFM) | Percent Change In Flow |
|---|---|---|---|
| 0.1 | 72 | 64 | −12.50% |
| 0.2 | 123 | 126 | 2.38% |
| 0.3 | 193.5 | 185 | −4.59% |
| 0.4 | 234 | 236 | 0.85% |
| 0.5 | 264 | 275 | 4.00% |
| 0.6 | 261 | 279 | 6.45% |
| 0.7 | 262.5 | 275 | 4.55% |
| 0.8 | 262.5 | 275 | 4.55% |
| No Valve | 265.5 | 275 | 3.45% |

This increase in the bare port flow capacity was caused by work done to the head before turn vane installation. This work included: the blending of the inlet port casting to the valve seat insert; Sanding to smoothing the inside radius of the port's turn; removal of the casting flash in upstream of the valve bowl by sanding; and perhaps, grinding the valve guide back flush with the top of the port.

Nevertheless, a horsepower increase of 25 percent, due to a 6 percent increase in flow at 0.5 to 0.6 inches of lift is very powerful. If turn vanes could be designed to optimize flow at these lifts larger improvements would be had. Also, the modified port flowed less at low lifts. Reductions in flow at very low lifts do not appear to hurt engine performance.

Table IV compares the turn vanes effects on the now modified port:

TABLE IV

| Lift | Post Test Flow (CFM) CFM | Turn Vane 1 Flow (CFM) | Percent Change In Flow |
|---|---|---|---|
| 0.1 | 64 | 72 | 12.50% |
| 0.2 | 126 | 141 | 11.90% |
| 0.3 | 185 | 196.5 | 6.22% |
| 0.4 | 236 | 234 | −0.85% |
| 0.5 | 275 | 264 | −4.00% |

TABLE IV-continued

| Lift | Post Test Flow (CFM) CFM | Turn Vane 1 Flow (CFM) | Percent Change In Flow |
|---|---|---|---|
| 0.55 | 287 | | |
| 0.6 | 279 | 279 | 0.00% |
| 0.7 | 275 | 285 | 3.64% |
| 0.8 | 275 | 292.5 | 6.36% |
| No Valve | 275 | 320 | 16.36% |

From the gross corner loss graph of FIG. 5, the loss coefficient for the bare port is 0.171. Calculation of the turn vane loss coefficient can now be done using the no valve mass flow ratio of 320/275 or 1.1636 and the relationship of the flow coefficients to this mass ratio. Its value is 0.126. Recalling that the design R/Hd for these vanes is 1.73 and using the FIG. 5 gross corner loss graph, a loss coefficient of 0.122 is expected. Had a loss coefficient of 0.122 been achieved, the flow would have been 1.184 times what was found by test. The 2 percent drop was caused by the epoxy used to hold the turn vanes in the port. Thus, good correlation between the test data and the corner loss curves was obtained.

In the vanned port, the valve clearly causes a flow loss at high lifts. The data yields a valve loss coefficient of the square of 320/292.5, which equals 1.094 squared, or a valve loss coefficient of 0.197.

Flow gains in the beginning of the valve movement made by the turn vanes were equaled by flow losses when the lift is between 0.400 and 0.550 inches. This is why the engine made the same power with or without the turn vanes. To understand why this happens, it is first necessary to know the flow pattern versus lift in a bare port.

In an unvanned port at 0.75 inches of valve lift, the flow totally separates from the inside wall of the port. Separation occurs down stream of the apex of the turn. Flow then shoots across the upstream side of the valve without even touching the head of the valve and hits the cylinder wall at a large angle. Static pressure testing (Flow bench testing) has found that the flow at this lift is 275 cubic feet of air per minute (cfm) with or without the valve installed. The losses due to bluff body flow around the valve stem are so low they are not measurable. Air and fuel are not turning and using the area on the other side of the valve. Half, or less of the available flow area is in use.

As valve lift decreases, the head of the valve contacts the jet moving across the valve bowl. This happens at 0.65 inches of lift. An interesting thing happens. The flow goes up to 279 cfm. The pressure increase caused by the valve head slowing the high speed jet forces some flow to turn and go around the valve. A larger area is in use for flow. More flow is the result. This continues until 0.55 inches of lift where the flow peaks at 287 cfm. Further movement of the valve into the seat slows the flow as a function of the square of the lift approximately. The definition of the hydraulic diameter can be used to model the lift-flow curve below 0.500 inches of lift.

The hydraulic diameter of the space between the valve and the valve seat is equal to twice the valve lift. Below is the development of this relationship:

$$Hd = \frac{4 \times \text{Area}}{\text{Perimeter}} = \frac{4 \times \left(\frac{\text{Pie} \times \text{Valve Dia.} \times \text{Lift}}{4}\right)}{2 \times \left(\frac{\text{Pie} \times \text{Valve Dia.}}{4}\right)}$$

This relationship continues until the valve lift equals half the hydraulic diameter of the annulus between the inside of the valve seat and the valve stem. Further valve lift will not increase the available flow area. For this head the maximum lift is 0.75 inches. Flow increases after 0.75 inches are due to reductions in the valve loss coefficient and are small.

Partition turn vanes boost flow at low lifts and at extremely high lifts. At lifts between four and six hundred thousandths the turn vanes hurt or do not contribute to flow. Some of this performance loss is from the fact that the turn vanes will not allow the flow to shift modes and go across the back side of the valve. However, another flow feature is at work in this lift range.

FIG. 12 shows foil vanes in the V-8 test head. The design of this type proceeded as follows. A curvature with a radius of 0.75 inches was selected to match the radius of the inside of the turn into the valve. The gap to cord ratios given above were averaged; This was done because, the port is rectangular at the beginning of the turn and circular at the end near the valve. Gap/cord ratios of 0.32, 0.52, and 0.70 (the averages) were initially chosen for each of the three passages created in the head. The out board vane was interfering with the valve stem so the spacings were reduced. Test gap/cord ratios were 0.273, 0.478, and 0.877. Cord to entrance characteristic length, c/d, is 0.6, far from the ideal of 0.33.

The following Table V gives flow bench test results for this foil vane design:

TAVLE V

| Lift | Post Test Flow (CFM) CFM | Turn Vane 2 Flow (CFM) | Percent Change In Flow |
|---|---|---|---|
| 0.1 | 64 | 66.5 | 3.91% |
| 0.2 | 126 | 124 | −1.59% |
| 0.3 | 185 | 173 | −6.49% |
| 0.4 | 236 | 220.5 | −6.57% |
| 0.5 | 275 | 261 | −5.09% |
| 0.55 | 287 | | |
| 0.6 | 279 | 279 | 0.00% |
| 0.65 | 275 | 288 | |
| 0.7 | 275 | 292.5 | 6.36% |
| 0.75 | 275 | 302 | 9.82% |
| 0.8 | 275 | 306 | 11.27% |
| No Valve | 275 | 346 | 25.82% |

An analysis of this Table V flow bench data gives a gross corner loss coefficient of one over the square of (346 divided by 275 times 0.171) or 0.108. This turn loss coefficient is well below the minimum obtainable with a partition design of 0.120. Yet, it is not near the constant thickness vane minimum loss coefficient of 0.098, as expected. Using the data above to calculate a valve loss coefficient yields 346/306 squared, equals 1.13 squared or a valve loss coefficient of 0.28.

This result is higher than what was found in the partition design by 3 percent on a mass ratio basis. It was observed that these vanes did not turn the flow the full sixty-seven degrees. The flow appeared to turn five degrees less than sixty-seven degrees. Using an ideal constant thickness turn vane to get the full turn will lower the valve loss coefficient, recovering 3 percent more flow.

Like the partition design, the foil design did not improve flow in the lift range of 0.4 to 0.6 inches. It appeared to hurt the flow in this lift range, even if ideal constant thickness vanes are used. Another flow feature is occurring.

The intake valve forces the inlet flow to move radially to the outside of the inlet port forming an annulus of flow. The inner diameter of the annulus in the valve seat area, above the valve seat and below the turn, can be calculated using the definition of the hydraulic diameter.

$$Hd = \frac{D_o^2 - D_i^2}{D_o} = 2 \times L$$

Where; Hd is the hydraulic diameter; $D_o$ is the outside diameter of the port (1.84"); $D_i$ is the inner diameter of the annulus; and L is the valve lift. Note the Pies and the fours have already been canceled.

Figure 15:
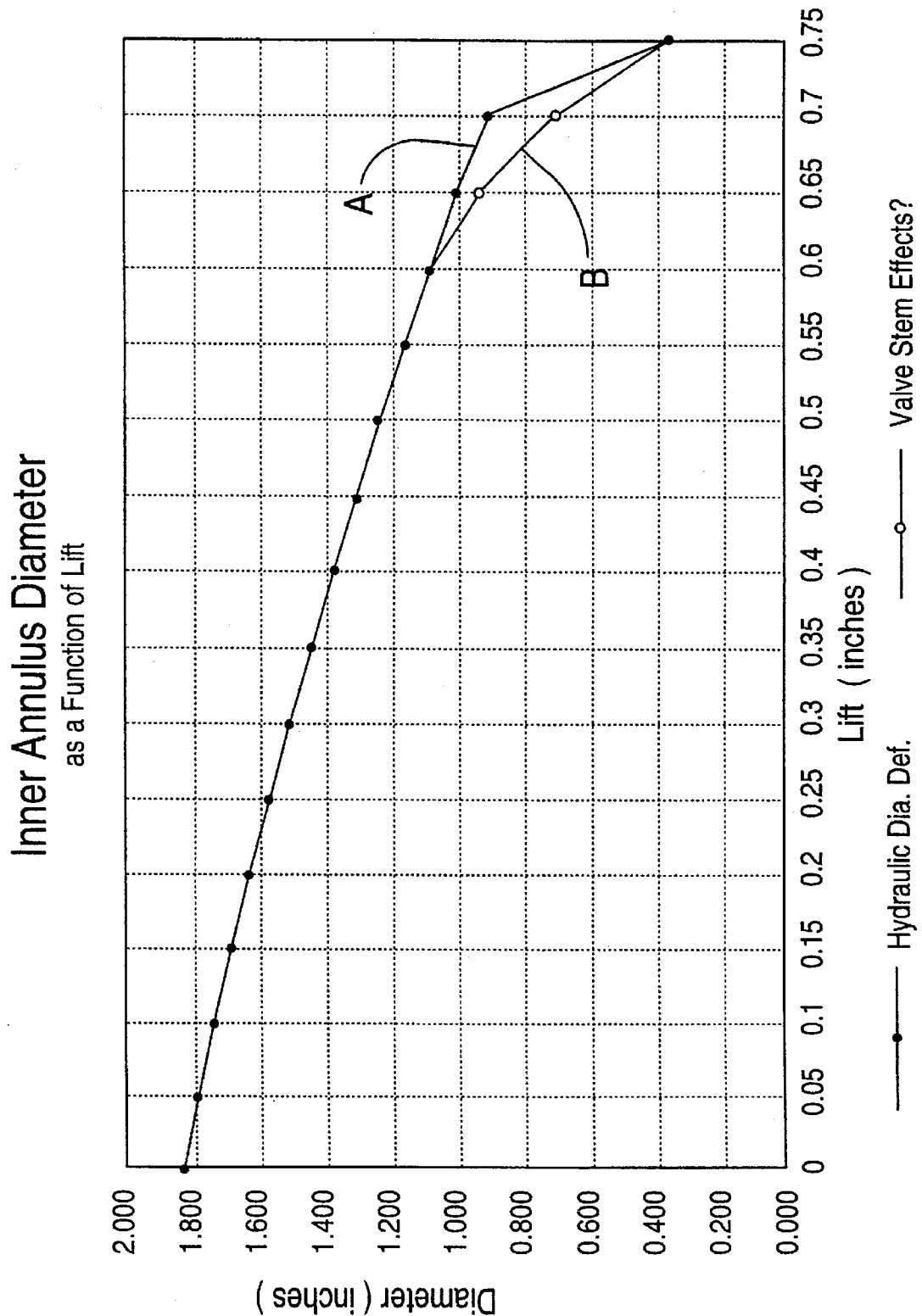
FIG. 15 is a graph of a V-8 engine intake valve port inner annulus diameter vs valve left.

Under ideal conditions this annulus is between the end of the turn and where the valve seat insert starts to flare out. The graph of FIG. 15 shows the inner diameter of the annulus as a function of lift:

The line marked A is based on the hydraulic diameter definition out to lift equals 0.7. Lift equals 0.75, is the diameter of the valve stem. Short line B represents an engineering guess, based on the flow bench data above combined with knowledge of boundary layer behavior, on how the annulus inner diameter changes from 0.6 to 0.75 inches of lift due to valve stem effects.

Figure 16:
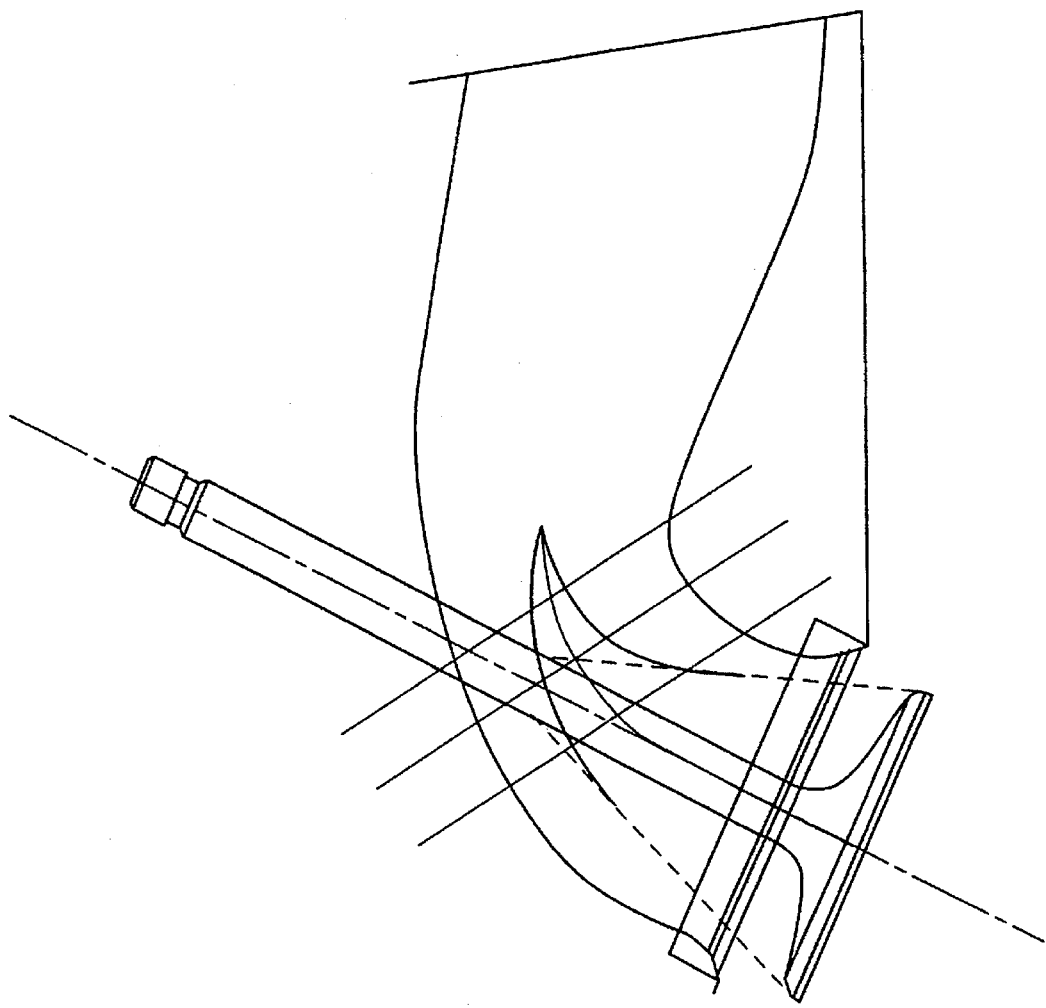
FIG. 16 illustrates an intake valve flow pattern at one-half inch of lift.

When the annulus is present, the flow pattern is no longer uniform on the upstream and downstream ends of the turn vanes. FIG. 16 of a "Half Inch Lift Flow Pattern" shows how the annulus requires the flow to redistribute. Lift, as the drawing title states, is equal to one-half inch lift. From the inner annulus diameter graph of FIG. 15, the inner diameter is 1.24. Port diameter is 1.84 at the seat so the thickness of flow stream is 0.3 inches.

Work that the author and others have done, shows that a bluff body has the lowest flow coefficient when it has an angle of 22 degrees presented to the flow stream. Similarly, the stagnant zone, where flow is roughly zero or not in the direction of main flow, is bounded by lines at forty-four degrees to each other. This 44 degree angle can also be visualized when the valve is in a flow stream directed coaxially with the valve and originating from the stem end. In FIG. 16, this flow boundary is represented by the dashed lines.

When the valve is in a head, the flow must curve. This curved stagnant flow zone, is represented by the bold arcs in the figure. Three parallel lines in the figure represent where the upstream, mid turn, and down steam ends of a simple foil array would be. Such a zone of no flow has two effects on the turn vanes. Flow is no longer distributed among the flow passages of the turn vanes evenly. Surfaces in shear with flow are changed, affecting the hydraulic diameter of the turn vane passages. Inlet and outlet hydraulic diameters are no longer equal and velocity differences are created in the passages hurting flow.

Turn vanes designed for even flow distribution, when lift equals 0.75, will not work well at intermediate lifts. Changes to the hydraulic diameters of the passages of the turn vanes, due to the stagnant zone, result in velocity differences between the passages. Velocity differences cause flow losses and to balance the turn vane flow gains in a running engine.

Figure 17:
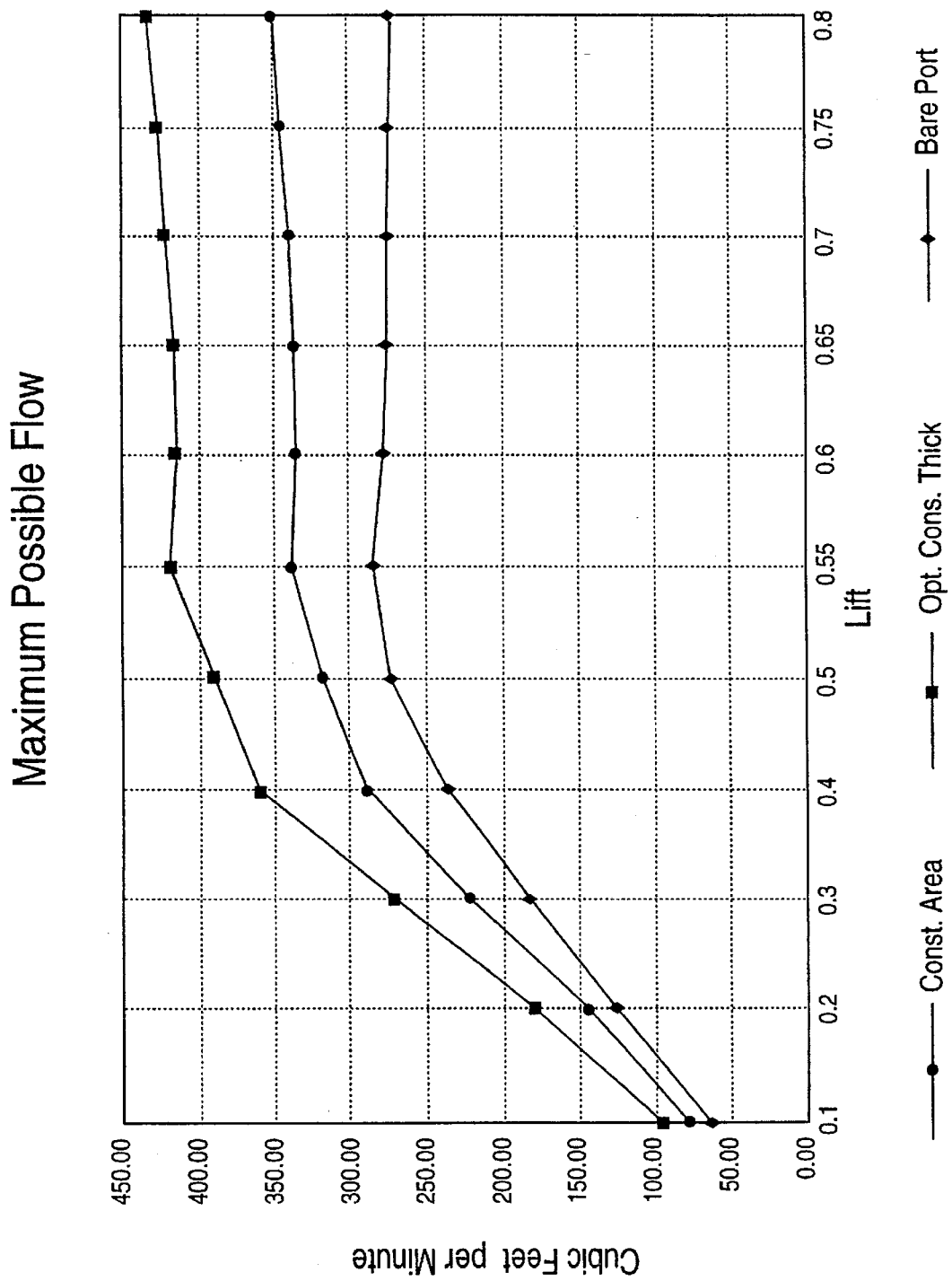
FIG. 17 is a graph to correlate a manifold flow rate to valve lift.

The graph of FIG. 17 depicts what an optimized constant thickness foil design and a constant area foil design should flow in the test head. Flow is calculated using the bare port flow times a mass ratio. Where the mass ratio equals the square root of the following division. The bare port's corner loss coefficient at each lift point, divided by the minimum obtainable loss coefficient for each design. Valve loss is included in the lift points above 0.400 inches. A valve loss coefficient of 0.196 was used.

An engine would run better with a design that flows the ideal amount in a narrow band. Mechanical limits force camshaft designers to use close to a pure sinusoidal motion to keep accelerations in check. If the flow were reduced in the low lift portion of valve movement, opening valve movement could start sooner in the engine's cycle. Just as closing movement could be delayed. The valve would be open further and longer during the intake stroke enhancing cylinder charging.

These same mechanical limits dictate valve lifts of 0.630 inches and less for engines that run for long periods. Street engines and racing engines that go long distances are examples. A design that would approach the maximum flow in the 0.500 or less range would be most beneficial. Flow bench test data and the Annulus curve suggest that a range of 0.300 inches of flow increase could be expected for a design that maximized flow in the 0.500 inch lift range. At lifts below 0.350, flow would be reduced. These two effects would combine to allow much better cylinder charge at all engine speeds.

Designing turn vanes that curve in several planes would broaden the range the peak flow occurs. Such vanes would have upsteam and downsteam edges that differ from a straight line. How much peak flow broadening that could be achieved would require more experimentation and design refinement to determine.

Twenty to 40 percent more mass would be in the inlet charged. Torque would increase by 20 to 40 percent and horsepower would increase dramatically. Other turning losses occur upstream of the cylinder head inlet port. As discussed previously, the intake manifold is one source of pressure loss.

A popular intake manifold for racing Chevrolet engines has a seventy-five degree turn just below the carburetor. An inside radius of 0.375 inches is used and the Hydraulic diameter of the manifold is 1.5. A gross corner loss coefficient of 0.288 results. Using an ideal partition design, the loss coefficient could be lowered to 0.129. A mass ratio of the square root of (0.288 divided by 0.129) or 1.49 is theoretically possible. A foil design could get over twice the mass through the manifold for a given pressure differential.

The development work has just scratched the surface of the potential. Exhaust gas flows occur at much higher pressures and velocities; creating vary large resistance to flow. High pressures at the end of the exhaust stroke leave more residual exhaust mass in the cylinder. Intake valve opening occurs during this point in the engine operating cycle. Exhaust and Intake flows interact with flow reversions and mixing. This contaminated charge does not burn well causing pollution and poor performance. Reducing exhaust flow losses should have a large impact on engine performance.

Exhaust flows with a radially inward component just above the head of the valve. Collision of this flow must occur to cancel this momentum. Flow is in the center of the port rather than the outside as in the inlet port. Turn vane design must include provisions for these effects for peak performance.

Further, reducing the intake flow losses improve engine thermal efficiency. Brake specific fuel consumption dropped by 9 percent at one point on the operating curve. This is due to lower pumping losses and better combustion. Further, these improvements in engine combustion will reduce emissions.

This dramatic increase in power density of engines will allow automobile manufactures to use smaller engines to propel their products. Automobiles require a fraction of their power to maintain interstate speeds—roughly ten to twenty horsepower. Passing and acceleration on to freeways takes many times more power, nearly as much as the engine can deliver. Small engines with high power output enable the design of lighter, lower profile automobiles that are more efficient due to weight savings and improved aerodynamic packaging while maintaining performance.

In addition, manufactures may produce vehicles that operate on a greater variety of fuels. Engines running on gaseous fuels do not make the power that atomized liquid fueled engines produce. Gaseous fuels, hydrogen, natural gas, LPG, propane, etc., have a much lower energy density than an atomized liquid fuel. More air is displaced by the gaseous fuel, so less air gets into the engine. Less air means less oxygen. Power levels are lowered proportionately. Forced induction, supercharging and turbocharging, will recover the lost power. However, turn vanes can increase the mass flow rates less expensively and without on-going operating costs.

Installing turn vanes into the passages of an internal combustion engine is not difficult. Engine parts are cast of iron or aluminum—and with increasing frequency plastics. Placing vanes into the core that forms the passage in a mold is a simple matter that is easily be accomplished. Filling the mold with molten material would trap the vane; much the same way reinforcing bar is in concrete. Obviously, the vanes must be made of a material with a higher melting point than the cast material. This is not new to the automotive field. Aluminum pistons are routinely cast with a steel ring inside to control thermal expansion.

In summary, properly designed turn vanes greatly reduce the gross turning loss coefficients and increase the mass flow rates into and out of an engine. Flows in an engine are reduced dramatically when the hydraulic diameter is lowered or when the hydraulic diameter of turn vane flow passages are unbalanced across the vanes. Careful design and experimentation are required to achieve the maximum benefits turn vanes offer.

The preceding detailed description has related many ways of using turning vanes in internal combustion engines. Infinite variations of the application of turning vanes to improve flows into and out of internal combustion engines are possible.

To define the core of this invention therefore, I make the following claims:

1. A method of increasing the gaseous mass flow rate through an internal combustion engine comprising the steps of:

providing at least one turning vane in a bend of an engine gas flow conduit having a flow direction change of greater than about 9° over a bend radius that is less than about twice the effective diameter of said conduit, said turning vane being disposed transversely of said conduit, substantially centered about a bend radius through the angular center of such bend and positioned radially within the conduit bend to divide the cross-sectional area of said conduit bend into a plurality of flow passages, each having substantially identical ratios of inside radius to hydraulic diameter.

2. A method as described by claim 1 wherein said turning vane arcs substantially about 25% of said conduit bend.

3. A method as described by claim 1 wherein an engine conduit bend of about 90° is provided with a turning vane having a downstream overturn of about 5°.

4. A method as described by claim 1 wherein a turning vane leading edge is formed to an included angle of about 20° to about 24°.

5. A method as described by claim 1 wherein a turning vane trailing edge is formed to an included angle of about 13° to about 17°.

6. A method as described by claim 4 wherein a turning vane trailing edge formed to an included angle of about 13° to about 17°.

7. A method of increasing the gaseous mass flow rate through an internal combustion engine comprising the steps of:

providing a plurality of flow turning foils in a bend of an engine gas flow conduit having a flow direction change of greater than about 9° over a bend radius that is less than about twice the effective diameter of said conduit, said turning foils being disposed transversely of said conduit, substantially centered about a bend radius through the angular center of such bend and spaced apart radially by a substantially constant separation gap distance, said foils being cross-sectionally configured to an inside arc surface radius that is greater than a respective outside arc surface radius wherein a ratio between the foil separation gap distance and a foil cord distance is between 0.33 and 0.75.

8. A method as described by claim 7 wherein a ratio between the foil separation gap distance and a foil cord distance is between about 0.35 and 0.40.

9. A method as described by claim 7 wherein the foil inside arc surface radius is configured to about 1.4 times the separation gap distance and the outside arc surface radius is configured to about 0.7 times the separation gap distance.

10. An internal combustion engine having fuel and exhaust gas flow conduits with flow direction turning arcs greater than 9° over an inside turn radius that is less than twice an effective conduit diameter, at least one turning vane disposed transversely of a corresponding conduit, said turning vane being substantially centered arcuately between a leading edge thereof and a trailing edge thereof about an arc radius through the angular center of such arc and radially positioned to divide the cross-sectioned area of the conduit arc into a plurality of flow passages, each having substantially identical ratios of inside radius to hydraulic diameter.

11. An internal combustion engine as described by claim 10 wherein said turning vane substantially arcs about 25% of said conduit arc.

12. An internal combustion engine as described by claim 10 wherein said turning vane has a downstream overturn of about 5°.

13. An internal combustion engine as described by claim 10 wherein said leading edge has an included angle of about 20° to about 24°.

14. An internal combustion engine as described by claim 10 wherein a turning vane trailing edge has an included angle of about 13° to about 17°.

15. An internal combustion engine as described by claim 13 wherein a turning vane trailing edge has an included angle of about 13° to about 17°.

16. An internal combustion engine having fuel and exhaust flow conduits with flow direction turning arcs greater than 9° over an inside turn radius that is less than twice an effective conduit diameter, a plurality of turning foils disposed transversely of a corresponding conduit, substantially centered arcuately between a leading edge thereof and a trailing edge thereof about an arc radius through the angular center of such conduit turning arc and spaced apart radially by a substantially constant separation gap distance, said foils having a cross-section configured by an inside arc surface radius that is greater than a respective outside arc surface radius and a ratio between the foil separation gap distance and a foil cord distance between about 0.33 and 0.75.

17. An internal combustion engine as described by claim 16 wherein the foil inside arc surface radius is about 1.4 times the separation gap distance and the outside arc surface radius is about 0.7 times the separation gap distance.

18. An internal combustion engine as described by claim 16 wherein a ratio between the foil separation gap distance and a foil cord distance is between 0.35 and 0.40.

* * * * *